Figures 1, 2, 3:
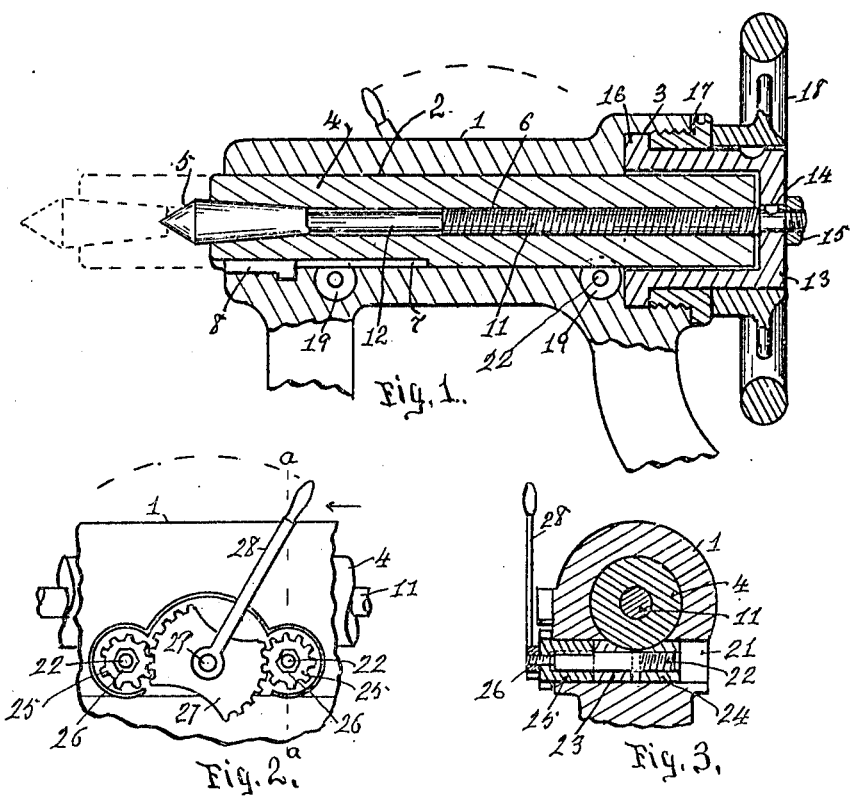

W. A. GREAVES.
TAIL STOCK.
APPLICATION FILED FEB. 8, 1909.

956,804.

Patented May 3, 1910.

Witnesses.
S. D. Roudebush.
Samuel S. Carr.

William A. Greaves. Inventor.
By Robert S. Carr.
Atty.

UNITED STATES PATENT OFFICE.

WILLIAM A. GREAVES, OF CINCINNATI, OHIO, ASSIGNOR TO GREAVES, KLUSMAN AND COMPANY, OF CINCINNATI, OHIO, A COPARTNERSHIP.

TAIL-STOCK.

956,804.  Specification of Letters Patent.  Patented May 3, 1910.

Application filed February 8, 1909. Serial No. 476,696.

*To all whom it may concern:*

Be it known that I, WILLIAM A. GREAVES, a citizen of the United States, residing at Cincinnati, Ohio, have invented a new and useful Improvement in Tail-Stocks, of which the following is a specification.

My invention relates to tail stocks adapted to use on engine lathes or elsewhere, and the objects of my improvements are to provide means for maintaining the spindle at all times within the full length of its bearings; to locate the hand wheel in closer proximity to the rear end of the spindle for economizing longitudinal dimensions; to provide means for preventing the spindle and barrel from becoming unevenly worn in relation to each other, and to provide such construction and assemblage of parts as to obtain the greatest durability and accuracy, together with increased efficiency and facility of operation. These objects are attained in the following described manner as illustrated in the accompanying drawings, in which:

Figure 1 is a longitudinal section with parts broken away of a tail stock embodying my improvements; Fig. 2, an elevation of a portion of the rear side and Fig. 3 a section on the line *a—a* of Fig. 2.

In the drawings, 1 represents the barrel formed with an axial bearing 2 and with an internally threaded counter bore 3 in its rear end. The spindle 4 provided with a removable center 5 and formed with a threaded axial opening 6 therethrough and with a spline groove 7 on the under side of its front portion is slidably mounted in said bearing and projects at either end therefrom to the extent of its longitudinal movement.

The usual key 8 removably secured within a notch formed within the front end of the barrel, movably engages with said spline groove and serves to prevent any rotative movement of the spindle and also by contact with the end of the spline groove to limit the extent of the forward movement of the spindle to the excess of its length over that of the bearing 2. The spindle screw 11 formed with a blank front portion 12 and threaded within the axial opening 6 is securely attached to the end wall of a thimble 13 by means of the usual key 14 and lock nut 15. Said thimble is formed to encircle the rear end portion of the spindle without contact therewith and terminates at its front end in an external annular flange 16 whereby the thimble may be rotatively seated and maintained within the barrel counterbore 3 by means of the collar 17 being adjustably threaded therein.

The hand wheel 18 removably secured on the rear portion of the thimble contiguous to said collar 17 serves to rotatively actuate the thimble and the spindle screw for effecting the longitudinal adjustment of the spindle within the barrel. The center 5 may be forced out of the spindle by contact of the end of the spindle screw therewith when the spindle reaches its most rearward position.

Plug clamps 19 slidably mounted within the transverse openings 21 formed in the barrel serve to lock the spindle in accurate alinement therewith in its different longitudinal adjustments. Each of said clamps consists of a bolt 22 loosely inserted through an ordinary clamping plug 23 and adjustably threaded in a similar plug 24. Pinions 25 splined on said bolts in contact with plugs 23 may be moved and maintained therewith in longitudinal adjustment by means of the adjusting nuts 26. A preferably segmental gear 27 provided with a handle 28 and mounted on a fixed stud 29 engages with both pinions 25 and serves to actuate the pinions together with the corresponding clamping plugs simultaneously. The construction and relative assemblage of the different members serve to secure greater accuracy and efficiency of operation than has been heretofore possible in devices of this class.

Having fully described my improvement, what I claim as my invention and desire to secure by Letters Patent of the United States is:—

1. In a tail stock, the combination of a barrel formed with a bore and with a counter bore, a spindle movable longitudinally within the bore, a spindle screw adjustably threaded therein, a thimble secured to said screw and provided with a hand wheel for rotating the thimble with the screw, said thimble being rotatively seated within the counter bore, and adjustable means for preventing the longitudinal movement thereof with the screw.

2. A tail stock comprising a barrel formed with a bore and with a counterbore, a spindle longitudinally movable within the bore, a screw threaded within the spindle, a thimble secured thereto and rotatively seated within the counterbore, and a collar adjustably threaded within the counterbore for maintaining the thimble therein.

3. In a tail stock, the combination with a barrel formed with a longitudinal bore, and with transverse openings intersecting said bore, and a spindle movable within said bore, of a pair of similar clamping plugs slidably mounted within each of said transverse openings, a bolt loosely inserted through one and adjustably threaded at one end in the other plug of each of said pairs, pinions splined on the opposite end of the respective bolts and in contact with the adjacent plug, adjusting nuts on the bolts for the pinions, and a segmental gear provided with a handle and journaled at a fixed point and in continuous engagement with the pinions whereby the clamping plugs may be simultaneously actuated in either of opposite directions for clamping or for releasing the spindle.

WILLIAM A. GREAVES

Witnesses:
WM. H. MORRIS,
R. S. CARR.